United States Patent [19]

Tsuge et al.

[11] 4,438,949
[45] Mar. 27, 1984

[54] AUTOMATICALLY FASTENING SEATBELT SYSTEM

[75] Inventors: Hiroshi Tsuge, Chiryu; Mitsuaki Katsuno, Toyota; Yuji Nishimura, Nagoya; Tatsushi Kubota, Okazaki; Tadao Yamada, Chiryu; Yoshihiro Hayashi, Kasugai, all of Japan

[73] Assignee: Kabushiki Kaisha Tokai-Rika-Denki-Seisakusho, Aichi, Japan

[21] Appl. No.: 309,509

[22] Filed: Oct. 7, 1981

[30] Foreign Application Priority Data

Oct. 15, 1980 [JP] Japan ............................. 55-143974

[51] Int. Cl.³ ............................................. B60R 21/10
[52] U.S. Cl. ..................................... 280/804; 280/808
[58] Field of Search ...................... 280/802, 804, 808; 297/469

[56] References Cited

U.S. PATENT DOCUMENTS

| 4,225,155 | 9/1980 | Seiffert et al. | 280/804 |
| 4,252,343 | 2/1981 | Suzuki et al. | 280/804 |
| 4,257,625 | 3/1981 | Takada | 280/804 |
| 4,362,321 | 12/1982 | Volk et al. | 280/804 |

Primary Examiner—Joseph F. Peters, Jr.
Assistant Examiner—Ross Weaver
Attorney, Agent, or Firm—Parkhurst & Oliff

[57] ABSTRACT

Automatically fastening seatbelt system, wherein an anchor plate engaged with one of restraining webbings is connected through a support device to a driving force transmitting member and made movable along a guide rail, whereby the webbings are automatically fastened to an occupant, a release device is provided at a predetermined position in the longitudinal direction of the guide rail, and the operation of the support device is released by the operation of the release device to release the anchor plate from the guide rail.

13 Claims, 16 Drawing Figures

AUTOMATICALLY FASTENING SEATBELT SYSTEM

BACKGROUND OF THE INVENTION

This invention relates to an automatically fastening seatbelt system capable of automatically fastening occupant-restraining-webbings about an occupant in an emergency of the vehicle.

Heretofore, there have been proposed various types of automatically fastening seatbelt systems capable of moving portions of the restraining-webbings to automatically fasten the restraining-webbings about the occupant, whereby the occupant is fastened by the webbings without fail, thereby the safety of the occupant is improved.

However, with such an automatically fastening seatbelt system as described above, sometimes, such an operation is necessary that the restraining-webbings is released for example in the case of the occupant's work of transferring baggages in a compartment of the vehicle. However, in the conventional automatically fastening seatbelt system, such a releasing of the webbing as described above is impossible, thus the occupant feel uncomfortableness due to the restriction to the behavior by the webbing especially during the baggage transferring work in the compartment.

BRIEF SUMMARY OF THE INVENTION

The present invention has been developed in view of the abovedescribed disadvantage of the prior art and has as its object the provision of an automatically fastening seatbelt system enabling the occupant to release the restraining webbings from driving means on demand.

To achieve the above object, in the automatically fastening seatbelt system according to the present invention, an anchor plate engaged with one of restraining-webbings is connected through a support device to a driving force transmitting member and made movable along a guide rail, whereby the webbings are automatically fastened to an occupant, a release device is provided at a predetermined position in the longitudinal direction of the guide rail, and the operation of the support device is released by the operation of the release device to release the anchor plate from the guide rail.

DETAILED DESCRIPTION OF THE PREFERRED EMBODIMENTS

Description will now be given of the embodiments of the present invention with reference to the drawings.

Figure 1:
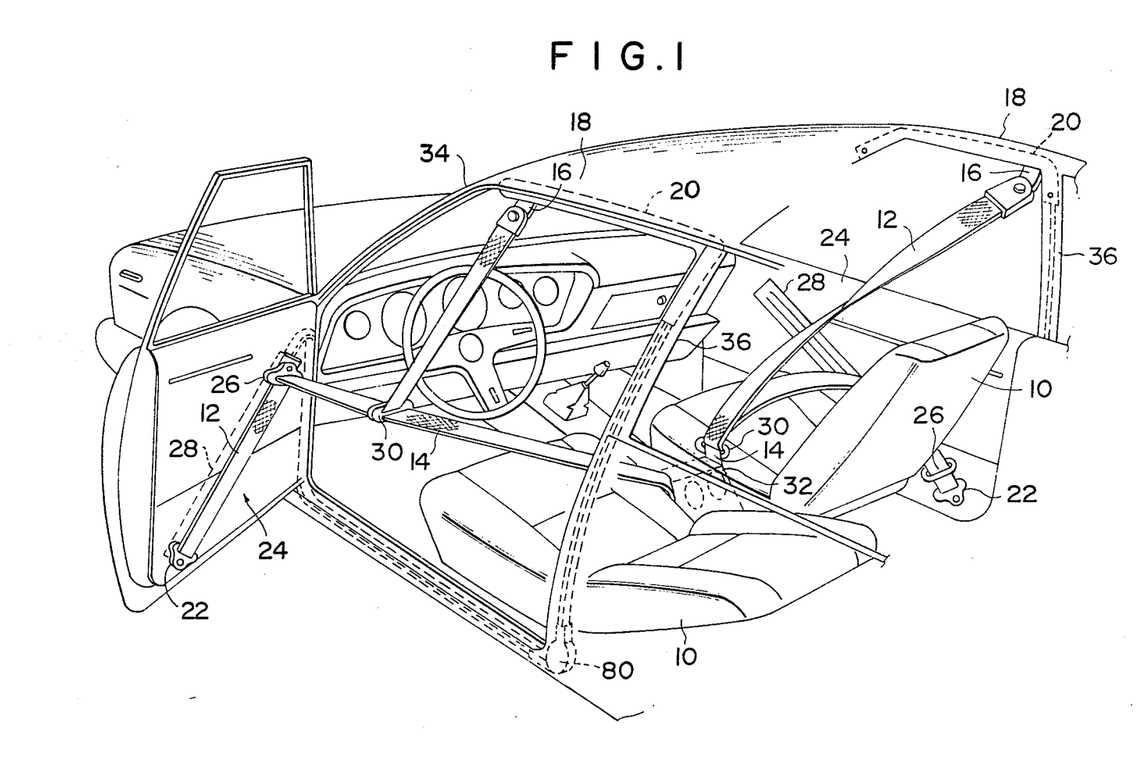
FIG. 1 is a perspective view showing a first embodiment of the automatically fastening seatbelt system according to the present invention.

FIG. 1 shows a first embodiment of the automatically fastening seatbelt system according to the present invention, in which an occupant sitting in a seat 10 is adapted to be brought into a three-point seatbelt fastened state by means of an outer webbing 12 and an inner webbing 14.

One end of the outer webbing 12 is engaged with an anchor plate 16, which is guided by a guide rail 20 laid along a roof side 18 of a vehicle body and movable back and forth in the vehicle. While, the other end of the outer webbing 12 is secured to the lower rear portion of a door 24 through a rotary anchor plate 22, and the intermediate portion of the outer webbing 12 extends through a through-ring 26, which is slidably guided by a guide rail 28 laid on the door 24 from the lower rear portion to the upper forward portion thereof.

A portion of the outer webbing 12 between the through-ring 26 and the anchor plate 16 extends through a joint 30, which is engaged with the forward end portion of the inner webbing 14. The base portion of this inner webbing 14 is wound into a retractor 32 by an urging force thereof. This retractor 32 incorporates therein an inertia lock mechanism for abruptly stopping the wind-out of the inner webbing 14 in an emergency of the vehicle.

Figure 2:
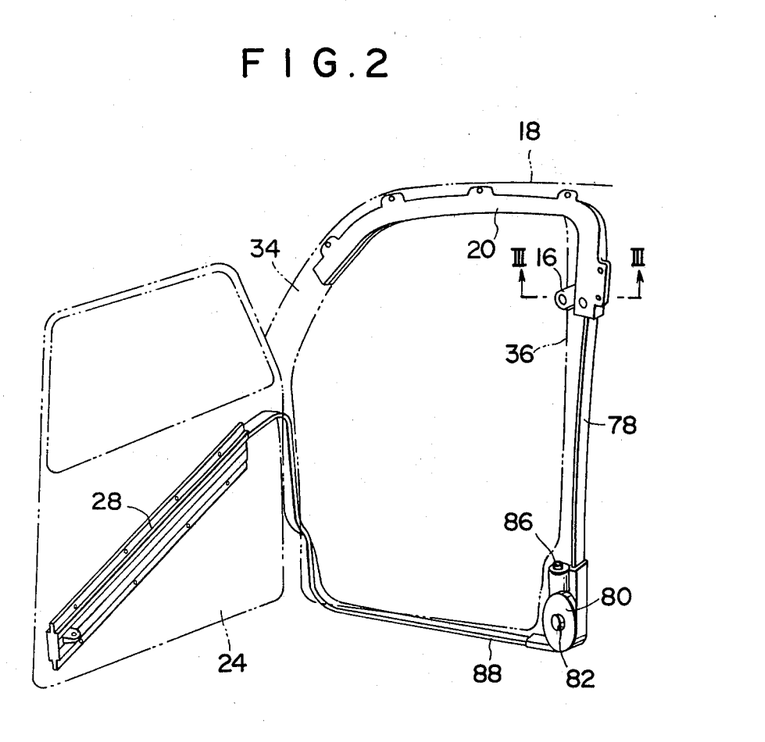
FIG. 2 is a perspective view showing the essential portions of FIG. 1.

As shown in FIG. 2, the guide rail 20 supporting the outer webbing 12 through the anchor plate 16 has the forward end portion in the longitudinal direction thereof descending along a front pillar 34 of the vehicle body and the rear end portion in the longitudinal direction thereof which is bent at substantially right angle to be suspended along a center piller 36.

Figure 3:
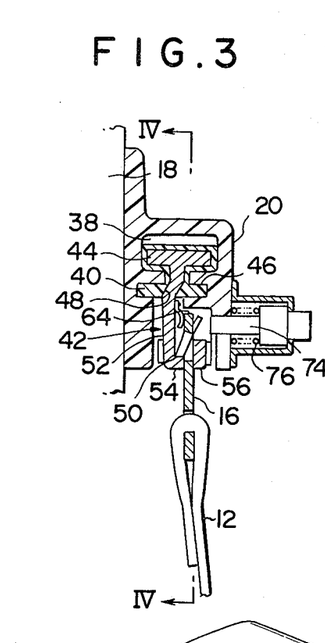
FIG. 3 is a sectional view taken along the line III—III in FIG. 2.
Figure 4:
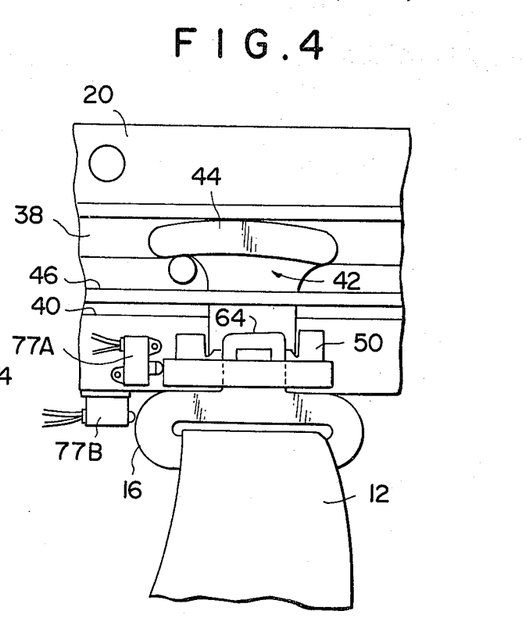
FIG. 4 is a sectional view taken along the line IV—IV in FIG. 3.

As shown in FIG. 3 and FIG. 4, the guide rail 20, in its cross section perpendicular to the longitudinal direction thereof, has an anchor groove 38 and a slide groove 40 in substantially parallel to each other, and these grooves are formed over the entire length of the guide rail 20. Inserted in this anchor groove 38 is a slide shoe 44 provided at an end portion of a support plate 42, thus an external force applied to the support plate 42 is transmitted through the slide shoe 44 to the guide rail 20 to be supported by the guide rail 20.

On the other hand, disposed in the slide groove 40 is a flexible tape 46 as a driving force transmitting member, in which a plurality of openings 48 are formed at suitable intervals in the longitudinal direction thereof. Inserted through one of these openings 48 is the intermediate portion of the support plate 42 to be engaged with the flexible tape 46.

Figure 5:
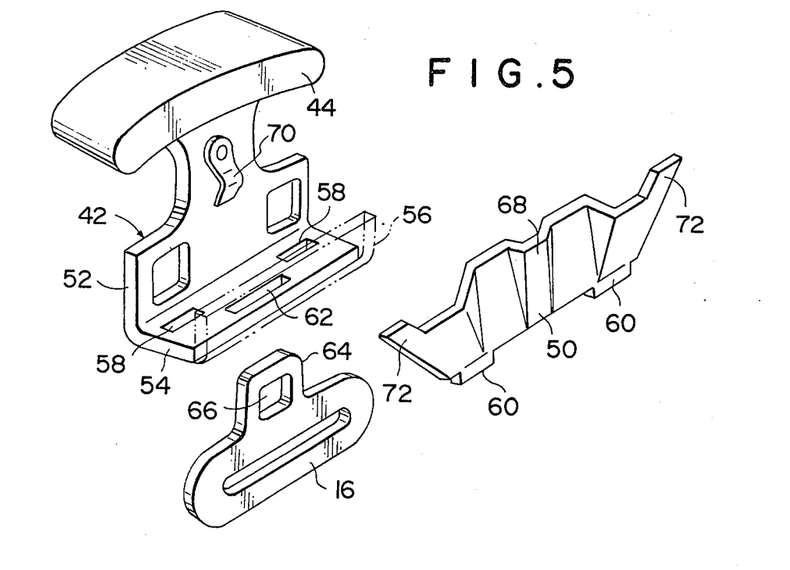
FIG. 5 is a disassembled perspective view showing the opposed relation of the support plate to the anchor plate.

As shown in FIG. 5, the other end of this support plate 42, which has extended through the flexible tape 46, is bent to be a substantially U-shape to hold a lock plate 50, the support plate 42 and the lock plate 50 constituting support means for the anchor plate 16.

Description will now be given in more detail. A first bent portion 54 being bent at a right angle is extended from a back plate 52 of the support plate 42 holizontally, further a second bent portion 56 is extended from the first bent portion 54 being further bent at a right angle therewith and in parallel to the back plate 52, and projections 60 constituting fulcrums for the rotation of the lock plate 50 are inserted into support holes 58 formed at positions close to the opposite ends of the first bent portion 54. Additionally, formed at substantially at the center of the first bent portion 54 is a guide hole 62, through which is extended an engageable projection 64 of the anchor plate 16. The lock plate 50 is provided thereon with a lock projection 68 engageable with an engageable hole 66 of the engageable projection 64, which has been extended through the guide hole 62, and this lock projection 68 is urged by a sheet spring 70 fixed to the back plate 52 of the lock plate 50 in a direction toward the second bent portion 56 to be engageable with the engageable hole 66. Formed at the opposite end portions of this lock plate 50 are abutting portions 72, and, when these abutting portions are pushed towards the back plate 52, the lock projection 68 is separated from the engageable hole 66 to release the anchor plate 16 from the guide hole 62 of the engageable projection 64, whereby the anchor plate 16 is disengaged from the support plate 42, so that an occupant can be released from the outer webbing 12.

Pushing pins 74 shown in FIG. 3 are secured to the forward and rear end portion, as viewed in the vehicle, of the guide rail 20 and opposed to the abutting portions 72 of the lock plate 50. Each of these pushing pins 74 constitutes release devices of the support means, and is normally separated from the abutting portions 72 by an urging force of a compression coil spring 76 interposed between the guide rail 20 and itself, however, when the support plate 42 reaches the forward or rear end portion, as viewed in the vehicle, of the guide rail 20, if the pushing pin 74 is pushed into the guide rail 20 to abut onto the abutting portion 72 by the occupant, whereby the lock plate 50 is rotated due to the abutting pressure applied to the abutting portions 72, so that the lock projection 68 of the lock plate 50 can be released from the engageable hole 66.

In addition, limit switches 77A and 77B (Refer to FIG. 4) are secured to the forward and rear portions, as viewed in the vehicle, of the guide rail 20, respectively, and electrically connected to control means, not shown. The limit switch 77A is adopted to abut against the support plate 42 to detect a state of the support plate 42 having reached the end portion of the guide rail 20, and the limit switch 77B to abut against the anchor plate 16 to detect the anchor plate 16 not having been released.

Figure 6:
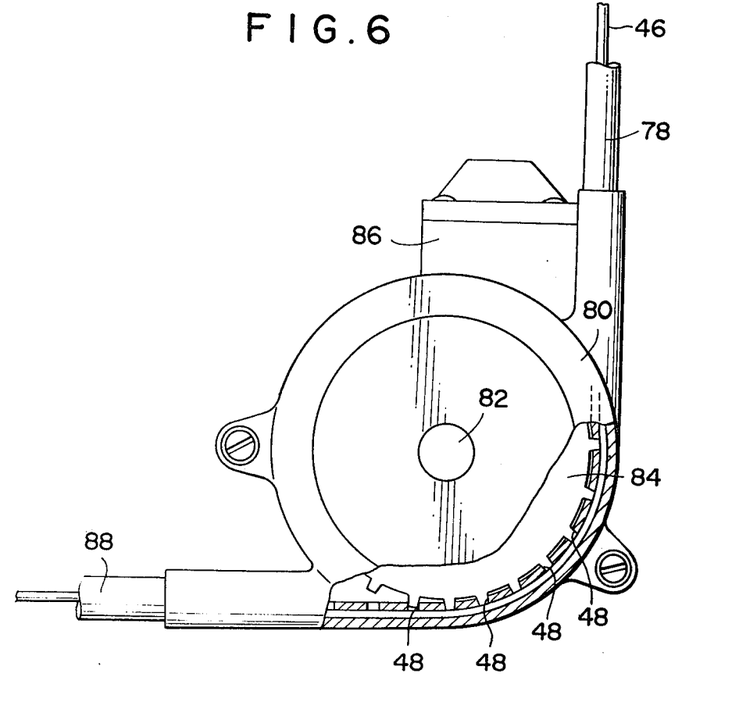
FIG. 6 is a partial sectional view showing the sprocket housing.

As shown in FIG. 2, a tape track 78 is connected to the rear end portion as viewed in the vehicle of the guide rail 20 and communicated with the slide groove 40 of the guide rail 20. The other end of this tape track 78, as shown in FIG. 6, is communicated with a sprocket housing 80 solidly secured to the lower portion of the center pillar 36. The flexible tape 46 extends through the slide groove 40 and the tape track 78 and is meshed at its openings 48 with a sprocket wheel 84 pivotally supported by a shaft 82 in a sprocket housing 80. This sprocket wheel 84 is connected through decelerating means, not shown, to a motor 86 to be rotated by a driving force of the motor 86, whereby the flexible tape 46 is moved in the longitudinal direction thereof by the motor 86. To cite an example, the motor 86, when the door 24 is closed, rotates the sprocket wheel 84 by a given number of revolutions in the clockwise direction in FIG. 6, and, when the door is opened, rotates the sprocket wheel 84 by a given number of revolutions in the counterclockwise direction. Additionally, the motor 86 is not fed with an electric current thereto while the limit switch 77B (Refer to FIG. 4) is not abutted against the anchor plate 16. Connected to this sprocket housing 80 in a direction opposite to the tape track 78 is a tape track 88 extending forwardly along the floor, by which the extension of the flexible tape 46 is guided. This tape track 88 enters the door 24 from the forward end portion of the door 24, and connected to the guide rail 28 in the door to guide the extension of the flexible tape 46 into this guide rail 28. This guide rail 28 is of an arrangement similar to the guide rail 20 solidly secured to the roof side of the vehicle body, and adapted to move the through-ring 26 to the forward or rear end portion, as viewed in the vehicle, of the door 24 due to the movement of the flexible tape 46.

Description will hereunder be given of operation of this embodiment with the abovedescribed arrangement. In FIG. 1 showing the driver's seat, the door is opened for allowing the occupant to enter the vehicle. The anchor plate 16 has been moved to the forward end portion, as viewed in the vehicle, of the guide rail 20 and the through-ring 26 has been moved to the forward end portion, as viewed in the vehicle, of the door 24 to separate the outer webbing 12 from the seat 10, whereby a space for allowing the occupant to enter the vehicle is formed between the outer webbing 12 and the seat 10.

When the occupant closes the door 24 upon sitting in the seat 10, the motor 86 rotates the sprocket wheel 84 in the clockwise direction in FIG. 6, whereby the flexible tape 46 moves the anchor plate 16 to the rear end portion, as viewed in the vehicle, through the support plate 42, and similarly, moves the through-ring 26 along the door 24 to the rear end portion in the vehicle. Then, the retractor 32 winds up an excessive portion of the inner webbing 14, whereby the joint 30 moves to a position close to the retractor 32, so that the occupant can be automatically brought into a three-point seatbelt fastened state by the outer webbing 12 and the inner webbing 14. In this case, a portion of the outer webbing 12 between the anchor plate 16 and the joint 30 functions as a shoulder webbing and another portion of the outer webbing 12 between the joint 30 and the anchor plate 22 as a lap webbing.

When the vehicle has fallen into an emergency such as a collision, the inertia lock mechanism incorporated in the retractor 32 abruptly stops the wind-out of the inner webbing, so that the occupant can be positively restrained to avoid colliding against dangerous obstacles. In this case, the anchor plate 16, as shown in FIG. 3, is positively supported by the guide rail 20 through the support plate 42, whereby a tensile force acting on the outer webbing 12 is reliably imparted to the roof side 18 of the vehicle body through guide rail 20, thereby enabling to secure the occupant safely.

When the occupant leaves the vehicle upon completion of normal running condition of the vehicle, if the door 24 is opened again, the motor 86 rotates in the reverse direction, the state shown in FIG. 1 is brought about, so that the occupant can easily leave the vehicle.

Furthermore, in case the occupant wants to release the webbing from the guide rail, the pushing pin 74 provided at the forward end portion, as viewed in the vehicle, of the guide rail 20 is pushed into the guide rail 20 when the door is opened and the pushing pin 74 provided at the rear end portion, as viewed in the vehicle, of the guide rail 20 is pushed into the guide rail 20 when the door is closed, the projection 68 of the lock plate 50 is disengaged from the anchor plate 16, whereby the anchor plate 16 falls off from the support plate 42, so that the occupant can make large actions in the compartment of the vehicle to carry out a necessary work. The operation of pushing the pushing pin is also applicable to the case where the occupant escapes to outside of the vehicle after the collision of the vehicle.

As described above, the motor 86 does not operate when the anchor plate 16 is in a released state, so as not to permit the flexible tape 46 to move.

In order to engage the anchor plate 16 with the support plate 14 again, the engageable projection 64 is inserted into the guide hole 62, then the lock projection 68 of the lock plate 50 is inserted into the engageable hole 66 by the urging force of the sheet spring 70, so that the anchor plate 16 can be easily and reliably engaged with the lock plate 50.

Figure 7:
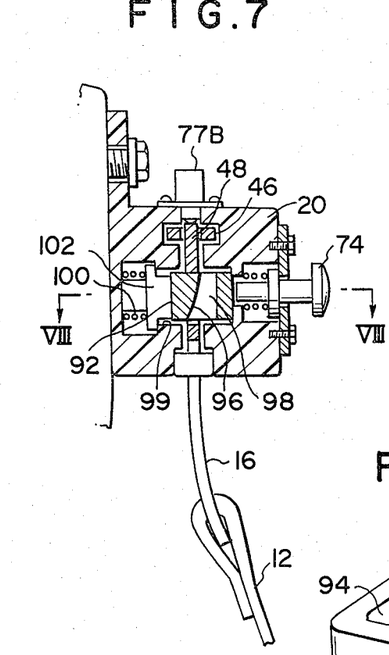
FIG. 7 is a sectionalview corresponding to FIG. 3 showing a second embodiment of the present invention.
Figure 8:
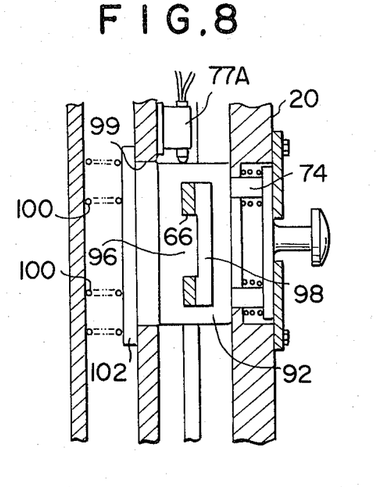
FIG. 8 is a sectional view taken along the line VIII—VIII in FIG. 7.

FIGS. 7 and 8 show a second embodiment of the present invention, in which the anchor plate 16 is extended upwardly longer than the anchor plate in the first embodiment, and the engageable projection 64 formed at the forward end portion of the anchor plate 16 is directly inserted into the opening 48 of the flexible tape 46.

Figure 9:
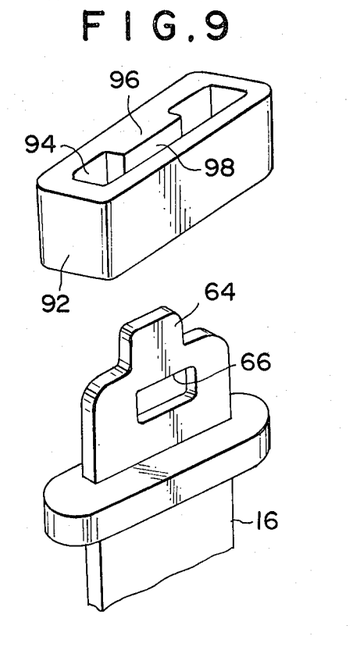
FIG. 9 is a perspective view showing the correlation between the lock block and the anchor plate.

Additionally, the engageable hole 66 is formed at the intermediate portion of this anchor plate 16, and a lock block 92 constituting the support means is engaged with this engageable hole 66. Description will now be given of the engagement of this lock block 92 with the anchor plate 16 in more detail. As shown in FIG. 9, formed at the intermediate portion of the lock block 92 is a guide hole 94 having rectangular shape in a cross-section, the length of the shorter side thereof is longer than the thickness of the anchor plate 16. A lock projection 96 is projected from one of the inner surface of the guide hole 94. The lock projection 96 has a projection height larger than the thickness of the anchor plate 16, and the distance between the forward end of the projection 96 and the opposite inner surface is wider than the thickness of the anchor plate.

This lock block 92 with the lock projection 96 thereof being inserted into the engageable hole 66 of the anchor plate 16 is movable in the anchor groove 38 of the guide rail 20 together with the anchor plate 16.

The pushing pins 74 are provided at the forward and rear portions, as viewed in the vehicle, of the guide rail 20 and opposed to the lock block 92. A cut-away portion 99 is formed at a portion of the guide rail 20 on the side opposite the pushing pin 74 with respect to the lock block 92, and has dimensions sufficient for receiving the lock block 92. An urging plate 102 urged by a compression coil spring 100 is provided in this cut-away portion 99 and urges the lock block 92 towards the pushing pin 72. However, when the pushing pin 74 is pushed into the guide rail 20 against the urging force of the compression coil spring 76, the lock block 92 can be move relative to the anchor plate 16, moving the urging plate 102. Limit switches 77A and 77B are provided at the forward and rear end portions, as viewed in the vehicle, of the guide rail 20 and are in contact with the lock block 92 and the anchor plate 16, respectively.

In this embodiment with the abovedescribed arrangement, during normal running condition of the vehicle, the lock projection 96 of the lock block 92 is engaged with the engageable hole 66 of the anchor plate 16, whereby the anchor plate 16 is prevented from being released from the flexible tape 46, with the result that the anchor plate 16 together with the lock block 92 and the flexible tape 46 move along the guide rail 20, so that the webbings can be automatically fastened about or released from the occupant.

Furthermore, in an emergency of the vehicle, a tensile force generated in the webbings is imparted to the guide rail 20 through the lock block 92, so that the occupant can be securely restrained.

If the occupant pushes the pushing pin 74 into the guide rail 20 on demand, the lock block 92 moves to the left in FIG. 7, whereby the guide hole 94 comes into register with the anchor plate 16 to let the anchor plate 16 to fall off from the flexible tape 46 and the lock block 92, so that the webbings can be released from the occupant. Additionally, in this embodiment, as an engageable projection 64 provided at a position adjacent the forward end of the anchor plate 16 is guided by the lock block 92, the anchor plate 16 is smoothly movable.

Figure 10:
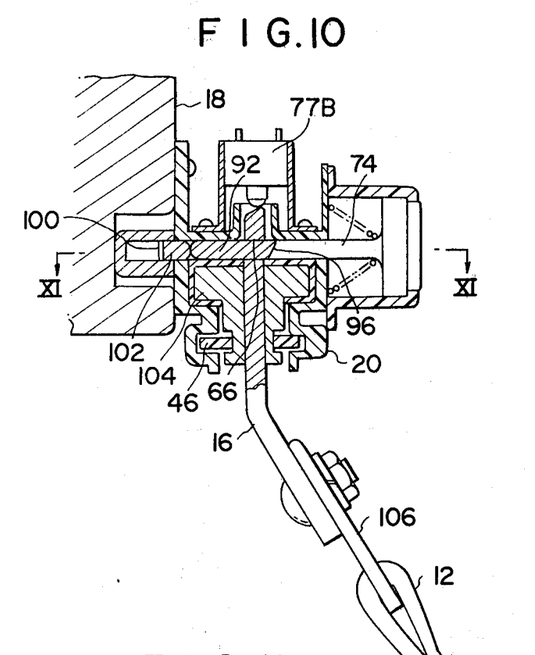
FIG. 10 is a sectional view corresponding to FIG. 3 showing a third embodiment of the present invention.
Figure 11:
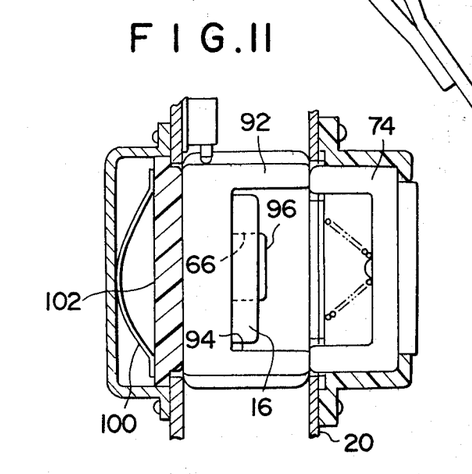
FIG. 11 is a sectional view taken along the line XI—XI in FIG. 10.

FIGS. 10 and 11 show a third embodiment of the present invention, in which, as differences from the abovedescribed second embodiment, the flexible tape 46 is disposed between the lock block 92 and the outer webbing 12, so that this lock block 92 can impart to the guide rail 20 an external force applied from the anchor plate 16 via a shoe 104 movable along the guide rail 20 together with the anchor plate 16.

Other aspects of the arrangement and functions of this embodiment are similar to those of the abovedescribed second embodiment, so that the lock projection 96 can be inserted into the engageable hole 66 of the anchor plate 16.

Figures 12, 13:
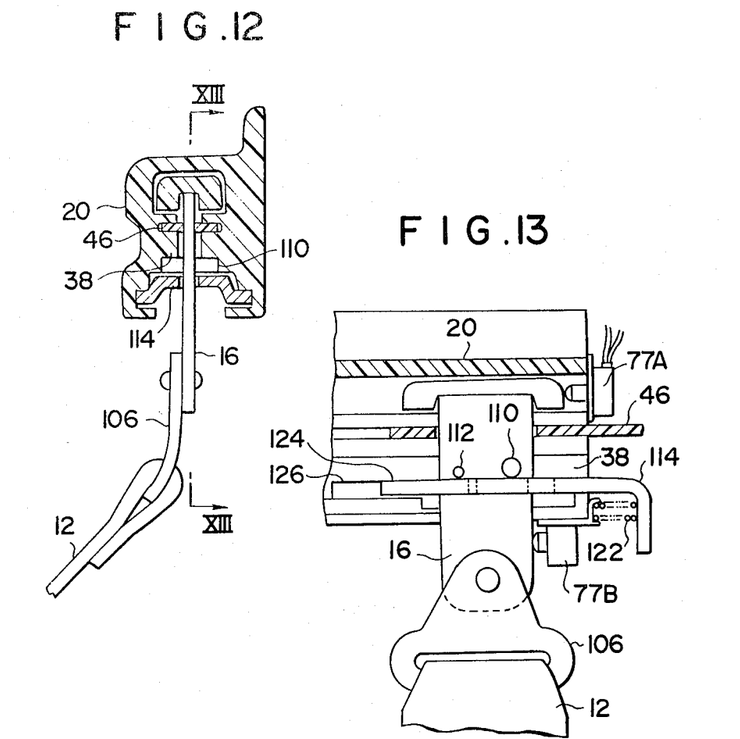
FIG. 12 is a sectional view corresponding to FIG. 3 showing a fourth embodiment of the present invention.
FIG. 13 is a sectional view taken along the line XIII—XIII in FIG. 12.
Figure 14:
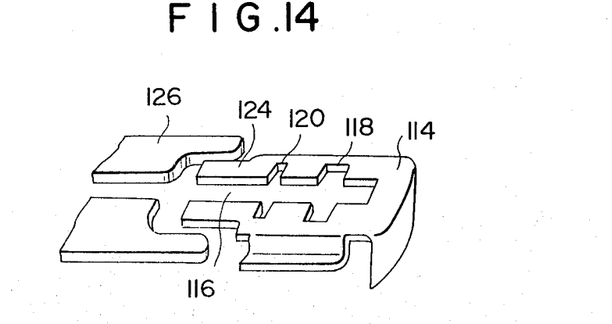
FIG. 14 is a perspective view showing the correlation between the release plate and the bottom surface of the anchor groove.

FIGS. 12 and 14 show a fourth embodiment of the present invention, in which the dislocation of the anchor plate 16 from the flexible tape 46 is prevented by a large-diameter pin 110 and a small-diameter pin 112, both of which extend through the intermediate portion of the anchor plate 16.

These pins 110 and 112 are movable in the slide groove 38 of the guide rail 20 and disposed on a release plate 114 when they reach the forward or rear end portion of the guide rail 20. This release plate 114 is provided therein with a first cutin 116 for receiving the anchor plate 16 at the intermediate portion of the first cutin 116, a second and a third cutins 118 and 120 for allowing the large-diameter pin 110 and the small-diameter pin 112 to be inserted therethrough, respectively. This release plate 114, by an urging force of a compression coil spring 122, normally disposes the second and third cutins 118 and 120 out of the scope of movement of the large-diameter and small-diameter pins 110 and 112, and, when the release plate 114 is pushed into the guide rail 20 against the urging force of the compression coil spring 122, causes the second and third cutins 118 and 120 to come into register with the pins 110 and 120, so that the anchor plate 116 can be released from the guide rail 20.

Furthermore, the forward end portion 124 of the release plate 114 is superposed on the guide rail 20, as viewed sideways from the guide rail 20, so that the pins 110 and 112 can be smoothly moved from the bottom surface 126 onto the release plate 114.

Also, in this embodiment, the limit switch 77B comes into contact with the anchor plate 16 when the anchor plate 16 is positioned at the forward or rear end portion as viewed in the vehicle.

Consequently, in this fourth embodiment also, the occupant pushes the release plate 114 into the guide rail 20 on demand, whereby the anchor plate 16 is released from the guide rail 20, so that the webbings can be released from the occupant.

Figures 15, 16:
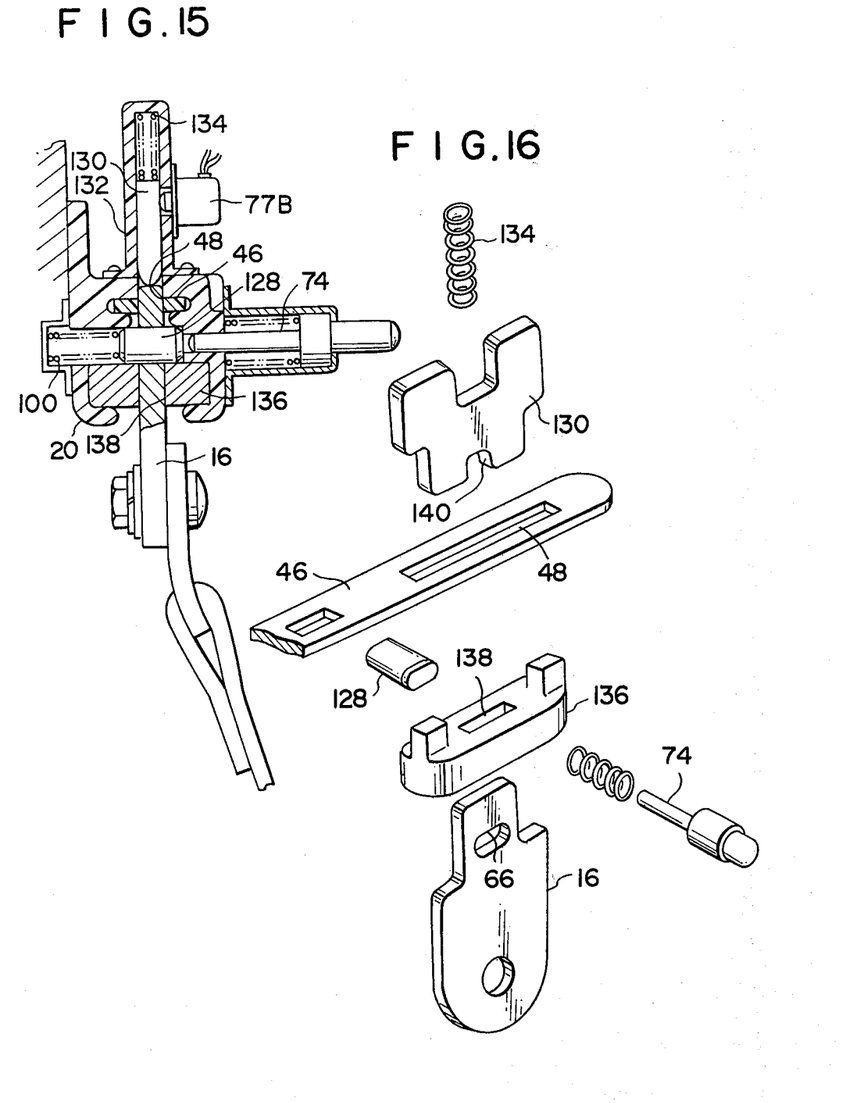
FIG. 15 is a sectional view corresponding to FIG. 3 showing a fifth embodiment of the present invention.
FIG. 16 is a disassembld perspective view showing the essential portions of FIG. 15.

FIGS. 15 and 16 show a fifth embodiment of the present invention, in which a lock pin 128 performs a function to engage the anchor plate 16 with the flexible tape 46. As shown in FIG. 16, this lock pin 128 has an elliptical cross section, and is inserted through the engageable hole 66 of the anchor plate 16, which has extended through one of the openings 48 of the flexible tape 46, so as to hold the anchor plate 16 and the flexible tape 46 in an engagement.

On the other hand, the pushing pin 74 is made smaller in diameter than this lock pin 128. Additionally, a stopper 130 being in contact with the top end of the anchor plate 16 is guided into the guide 132 fixed to the guide rail 20 and movable in a direction perpendicular to the longitudinal direction of the guide rail 20. This stopper 130 is urged against the anchor plate 16 by an urging force of a compression coil spring 134, and, when the anchor plate 16 is released, is inserted into an anchor plate guide hole 138 of a support block 136 extended through one of the openings 48 of the flexible tape 46, so that the support block 136 and the flexible tape 46 can be prevented from moving. Additionally, this stopper 130 is formed at the forward end thereof with a semicircular cut-away portion 140 so that the stopper 130 at its lower position does not interfere with the pushing pin 74.

In addition, in this embodiment, the limit switch 77B is opposed to the stopper 130 for operating, when the stopper moves, to detect a released state of the anchor plate 16.

Consequently, in this embodiment, when the occupant pushes the pushing pin 74 into the guide rail 20 on demand, the lock pin 128 is pushed out of the engageable hole 66 of the anchor plate 16 against the urging force of the spring 100, whereby the anchor plate 16 is slightly moved in the releasing direction until the upper inner surface of the engageable hole 66 abuts against the pushing pin 74, and, when the occupant removes the urging of the pushing pin 74, the pushing pin 74 is also released from the engageable hole 66 of the anchor plate 16, whereby the anchor plate 16 is pushed out by the stopper 130 to be released from the guide rail 20. In this released state, the stopper 130 extends through one of the openings 48 of the flexible tape 46 to be inserted into the guide hole 138 of the support block 136, whereby, even in the released state of the anchor plate 16, the flexible tape 46 and the support block 136 are not moved relative to the guide rail 20, and, when the occupant inserts the anchor plate 16 into the guide hole 138 of the support block 136 again, whereby the engaged state shown in FIG. 15 is brought about, so that the anchor plate 16 can be positively connected to the flexible tape 46.

In addition, in the respective embodiments described above, the anchor plate 16 is made released at the forward or rear end portion as viewed in the vehicle of the guide rail 20, however, the releasing can be easily changed to be made at the intermediate portion of the guide rail 20 so that occupant can release the anchor plate 16 at the intermediate portion as necessary.

In addition, in the respective embodiments described above, the anchor plate is opposed to the release device at the stroke end of the normal stroke, along which the anchor plate moves so as to automatically fastening the webbings about the occupant, however, it is possible that this release device is disposed out of the normal stroke, so that, as necessary, the occupant can move the anchor plate out of the normal stroke to bring the anchor plate into opposed relation to the releasing means.

As has been described hereinabove, the automatically fastening seatbelt system of the present invention can offer such an outstanding advantage that the anchor plate is made released from the guide rail by the release device, so that the occupant can be released from the automatically fastened seatbelt system on demand to do necessary works.

What we claim is:

1. An automatically fastening seatbelt system comprising:
    a guide rail laid on a vehicle body;
    a driving force transmitting member movable along said guide rail;
    an anchor plate connected to an occupant-restraining-webbing and movable along said guide rail;
    a support device movable along said guide rail and supporting said anchor plate on said guide rail for applying a driving force of the driving force transmitting member to said anchor plate to move said anchor plate along said guide rail, whereby said webbing is caused to approach or recede from the occupant; and
    a release device provided at a predetermined position in the longitudinal direction of said guide rail for releasing said anchor plate from said guide rail when said support device reaches said predetermined position,
    wherein said driving force transmitting member is a flexible tape movable in a slide groove formed in the guide rail, a portion of said anchor plate is extended through an opening formed in said flexible tape to receive a driving force of said tape, and said support device is movable by being guided by an anchor groove formed in the guide rail and engaged with the anchor for preventing said anchor plate from being detached out of the opening of said tape.

2. An automatically fastening seatbelt system as set forth in claim 1, wherein said support device has a support plate movable by being guided by an anchor groove formed in said guide rail, and said support plate is engageable with said anchor plate.

3. An automatically fastening seatbelt system comprising:
    a guide rail laid on a vehicle body;
    a driving force transmitting member movable along said guide rail;
    an anchor plate connected to an occupant-restraining-webbing and movable along said guide rail;
    a support device movable along said guide rail and supporting said anchor plate on said guide rail, whereby said webbing may approach or recede from the occupant; and release devices provided at the forward and rear end portion, respectively, in relation to the vehicle body, of said guide rail for releasing said anchor plate from said guide rail when said support device reaches either said forward or rear end portion.

4. An automatically fastening seatbelt system as set forth in claim 3, wherein said driving force transmitting member is a flexible tape movable in a slide groove formed in said guide rail, said support device has a support plate movable along an anchor groove formed in said guide rail, and said support plate is engageable with said anchor plate.

5. An automatically fastening seatbelt system as set forth in claim 4, further comprising:
a bent portion extending from said support plate;
a lock plate having a lock projection and pivotably supported on said bent portion; and
an engageable projection extending from said anchor plate,
wherein said engageable projection is extended through an opening formed in said bent portion, and said engageable projection is engaged with said lock projection for preventing said anchor plate from being detached out of said support plate.

6. An automatically fastening seatbelt system as set forth in claim 1, wherein said support device comprises a lock block slidably provided in said guide rail and having a guide hole with a lock projection therein, said anchor plate may be extended through said guide hole, said guide rail has a cut-away portion in which said lock block is slidable where said release device is provided, and said lock projection is engageable with said anchor plate for preventing said anchor plate from being detached from said guide rail.

7. An automatically fastening seatbelt system as set forth in claim 3, wherein said support device comprises a lock block slidably provided in said guide rail and having a guide hole with a lock projection therein, said anchor plate may be extended through said guide hole, said guide rail has a cut-away portion in which said lock block is slidable where said release device is provided, and said lock projection is engageable with said anchor plate for preventing said anchor plate from being detached from said guide rail.

8. An automatically fastening seatbelt system as set forth in claim 1, wherein said support device comprises a lock plate slidably provided in said guide rail, said lock plate including a lock projection, said guide rail has a cut-away portion in which said lock plate is slidable where said release device is provided, and said lock projection is engageable with said anchor plate for preventing said anchor plate from being detached from said guide rail.

9. An automatically fastening seatbelt system as set forth in claim 3, wherein said support device comprises a lock plate slidably provided in said guide rail, said lock plate including a lock projection, said guide rail has a cut-away portion in which said lock plate is slidable where said release device is provided, and said lock projection is engageable with said anchor plate for preventing said anchor plate from being detached from said guide rail.

10. An automatically fastening seatbelt system as set forth in claim 1, wherein said support device comprises pin means projecting from said anchor plate, said release device comprises a release plate having a cutout through which said pin means could pass, and said release plate is engageable with said anchor plate for preventing said anchor plate from being detached from said guide rail.

11. An automatically fastening seatbelt system as set forth in claim 3, wherein said support device comprises a pin means projecting from said anchor plate, said release device comprises a release plate having a cutout through which said pin means could pass, and said release plate is engageable with said anchor plate for preventing said anchor plate from being detached from said guide rail.

12. An automatically fastening seatbelt system as set forth in claim 1, further comprising:
an engageable projection extending from said anchor plate and having an engageable hole therein; and
a lock pin slidable through said engageable hole,
wherein said engageable projection is extendable through an opening formed in said support device, and said lock pin in engageable with said support device and through said hole for preventing said anchor plate from being detached from said guide rail.

13. An automatically fastening seatbelt system as set forth in claim 3, further comprising:
an engageable projection extending from said anchor plate and having an engageable hole therein; and
a lock pin slidable through said engageable hole,
wherein said engageable projection is extendable through an opening formed in said support device, and said lock pin is engageable with said support device and through said hole for preventing said anchor plate from being detached from said guide rail.

* * * * *